United States Patent [19]

Bala

[11] Patent Number: 5,373,392
[45] Date of Patent: Dec. 13, 1994

[54] PHOTOCHROMIC LIGHT CONTROL MIRROR

[75] Inventor: John Bala, Pomfret Center, Conn.

[73] Assignee: Aotec, Inc., Southbridge, Mass.

[21] Appl. No.: 99,034

[22] Filed: Jul. 28, 1993

[51] Int. Cl.[5] .............................................. G02F 1/03
[52] U.S. Cl. .................................... 359/241; 359/359;
359/360; 359/361; 359/603; 359/608; 359/839;
359/884
[58] Field of Search ............... 359/359, 360, 361, 602,
359/603, 608, 838, 839, 884, 241, 242, 266, 267,
268, 269, 270, 271, 272, 273; 313/112, 113, 114,
115, 116

[56] References Cited

U.S. PATENT DOCUMENTS

| | | | |
|---|---|---|---|
| 2,790,350 | 4/1957 | Cameron | 359/603 |
| 3,756,692 | 9/1973 | Scott | 359/241 |
| 4,906,085 | 3/1990 | Sugihara et al. | 359/839 |
| 5,128,799 | 7/1992 | Byker | 359/839 |

Primary Examiner—Loha Ben
Assistant Examiner—Thomas Robbins
Attorney, Agent, or Firm—Fishman, Dionne & Cantor

[57] ABSTRACT

A photochromic light control mirror comprises a photochromic substrate having a reflective film deposited at one side thereof. Alternatively, a mirror (i.e., a layer of glass having a reflective film deposited at one side thereof) is coated with a photochromic coating. An ultraviolet light source illuminates the photochromic material to change the reflectance of the mirror. The reflectance can be manually controlled whereby the intensity of the light source is controlled by adjusting the voltage driving the light source. Alternatively, the reflectance can be automatically controlled whereby the intensity of the light source is controlled by a photo detector which varies the voltage driving the light source in response to detected light.

31 Claims, 4 Drawing Sheets

PHOTOCHROMIC LIGHT CONTROL MIRROR

BACKGROUND OF THE INVENTION

Drivers of automotive vehicles, including, e.g., passenger cars, vans, buses and trucks, depend on rear view mirrors for visual information of the road and surrounding area. This information is vital to the safety of the driver and any passengers transported in the vehicle. Often bright light from, for example, another vehicle's headlights or sunlight is reflected into the rear view mirror causing glare and a reduction in the visual acuity of the driver. Therefore, the potential safety of the driver and passengers will be at risk.

In the past, to alleviate the glare problem, electrochromic mirrors having variable reflectivity have been commercialized as rear view mirrors for automotive vehicles. Electrochromism is a reversible color change phenomenon of a material induced by an applied electric current. In an all solid device, the device consists of several layers of thin film coatings. A typical device consists of a glass substrate on which a transparent conductive indium tin oxide (ITO) coating is laid down. An anodic electrochromic layer is coated on top of the ITO conductive layer, followed by a solid state electrolyte, then a cathode electrochromic layer. An aluminum reflector is used as the other conductor for completing the current circuitry. An electronic control switch is used for controlling the transmission of the electrochromic layers, and thus, the reflectivity from the aluminum reflector to achieve the variable reflectivity feature of this prior art device.

SUMMARY OF THE INVENTION

The above-discussed and other drawbacks and deficiencies of the prior art are overcome or alleviated by the photochromic light control mirror of the present invention. In accordance with the present invention, a photochromic light control mirror comprises a photochromic substrate having a reflective film deposited at one side thereof. Alternatively, a mirror (i.e., a layer of glass having a reflective film deposited at one side thereof) is coated with a photochromic coating. An ultraviolet light source illuminates the photochromic material to change the reflectance of the mirror. The reflectance can be manually controlled whereby the intensity of the light source is controlled by adjusting the voltage driving the light source. Alternatively, the reflectance can be automatically controlled whereby the intensity of the light source is controlled by a photo detector which varies the voltage driving the light source in response to detected light.

The variable reflectivity mirror is disposed in a housing suitable for its particular application (e.g., internal or external automotive use). An ultraviolet (UV) light screen is provided at the front of the mirror assembly to block UV light; (1) from the light source within the housing, and (2) from an external source which would undesirably vary the reflectance of the mirror.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DESCRIPTION OF THE PREFERRED EMBODIMENT

In accordance with the present invention, reflectivity of a mirror is varied using photochromism. Photochromism is a reversible color change of a material which is induced by light. There are numerous materials, inorganics and organics, which show this phenomenon. Some exemplary photochromic materials are photochromic glasses, anils, spiropyrans, spirooxazines and luigides. The active ingredient of photochromic glasses is silver halide microcrystals which are finely dispersed in the protective inert environments of glasses. Upon exposure to sunlight or ultraviolet light, silver atom aggregates are formed which induce a color change. Upon removal of the exposure light, the silver atom aggregates revert to the silver ions and the original color reappears. Photochromic glasses are commercially available from, for example, Corning as Photogray Extra and Photobrown Extra; Pilkington as Reactolite Rapid Gray and Reactolite Rapid Brown; and Deutsche Speziaglas AG as Photosolar Super.

In general, organic photochromic compounds such as spiropyrans and spirooxazines are solid powders. They are not photochromic in the solid form. Typically, they are dissolved either in a solvent or a polymeric medium in order to have the photochromic activity. Such photochromic plastic products are commercially available from, for example, Transitions Opticals as Transitions, Enichem as Variacrol and Matsui as Photopia.

Figure 2:
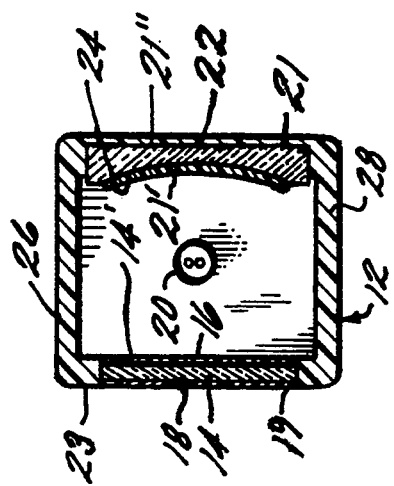
FIG. 2 is a sectional view along with line 2—2 of FIG. 1.
Figure 1:
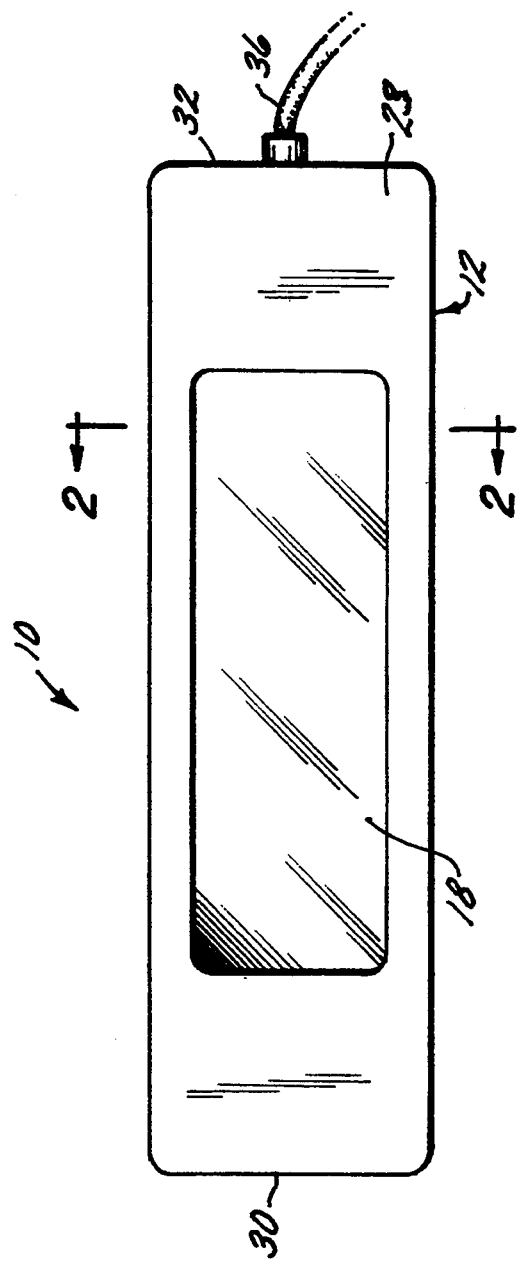
FIG. 1 is a front view of the photochromic light control mirror in accordance with the present invention.

Referring to FIGS. 1 and 2, a photochromic light control mirror is shown generally at 10. Mirror 10 comprises a housing 12 supporting a photochromic substrate 14 having a reflective coating 16 is deposited thereon. Reflective coating 16 is preferably comprised of a dielectric coating. The dielectric coating is transmittable ultraviolet light (i.e., light wavelengths of about $4 \times 10^{-5}$ cm to about $1.6 \times 10^{-5}$ cm) and reflective to visible light (i.e., light wavelengths of about $7 \times 10^{-5}$ cm to about $4 \times 10^{-5}$. The dielectric coating preferably comprises eleven periods of high and low refractive index (RI) layers. In thin film coating notation, the coating is represented as $1.52/(HL)^5(1.3H\ 1.3L)^5 1.5H\ 0.5L/1.00$.

Where:
1.52 represents a glass substrate having refractive index of 1.52;
H is the high RI layer, e.g., titanium oxide layer; and
L is the low RI layer, e.g., silica layer.

Figure 3:
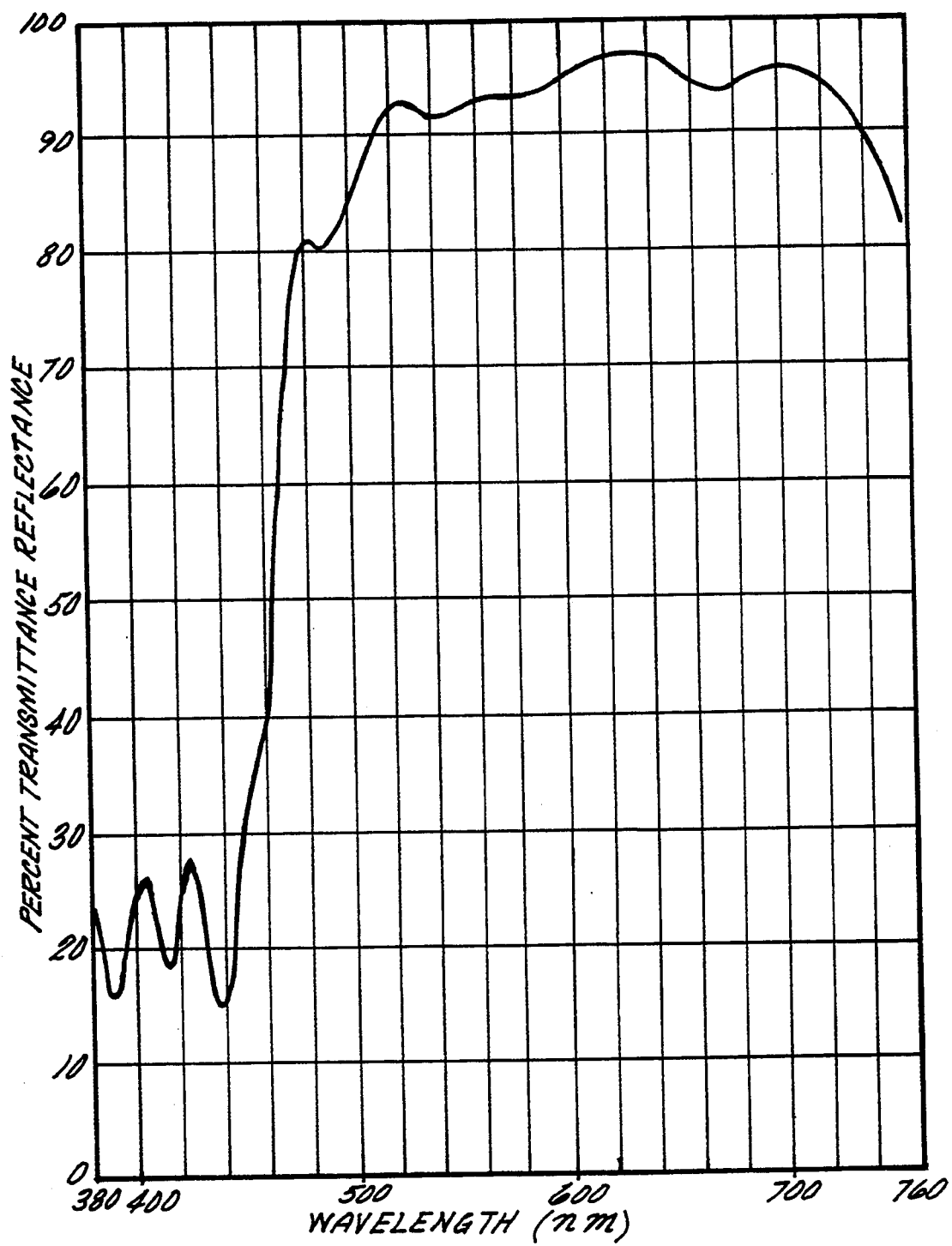
FIG. 3 is a plot of percent transmittance reflectance versus wavelength for the reflectance spectrum of the dielectric coating in accordance with the present invention.

The numerals preceding the H and I above are the optical thicknesses of the coating layers. 1.00 represents the RI of air. The reflectance spectrum of the coating is shown in FIG. 3. Reflective coating 16 is disposed on surface 14' of substrate 14. An ultraviolet light screen 18 is disposed on or adjacent to surface 14" of substrate 14 and is exposed through an opening 19 in housing 12. Screen 18 blocks ultraviolet light and comprises, for example, a dielectric coating which is transmittable to visible light and opaque to ultraviolet light or an ultraviolet absorbing coating. An ultraviolet (UV) light source 20 (e.g., a black light fluorescent source) is disposed within housing 12 between substrate 14 and a reflective optical lens 21. Lens 21 comprises a front concave surface 21' and a rear flat surface 21" with a reflective coating 22, for example a film of silver or aluminum, disposed on the concave surface 21' Lens 21 directs UV light from source 20 towards photochromic substrate 14. Housing 12 is preferably comprised of a plastic material suitable for automotive use. Photochromic substrate 14 preferably comprises a photochromic glass, such as Photogray Extra (Corning) or Reactolite Rapid Gray (Pilkington). In will be appreciated that the size and shape of the mirror 10 is dependant on the particular application. In the case of the rear view mirror inside a vehicle, the mirror is approximately two to three inches in width and eight to twelve inches in length. For mirrors mounted on the outside of a vehicle, the size varies depending on whether it is used for a passenger car or truck. The mirror may be approximately four by five inches to six by eighteen inches.

In this example, housing 12 has a generally rectangular shape comprising front, rear, top, bottom and side panels 23, 24, 26, 28, 30 and 32 respectively. Light source 20 is shown disposed at about the focus point of lens 21, however it may be positioned elsewhere in the housing provided sufficient light can illuminate substrate 14. For example, light source 20 could be wrapped around the inner surface of the housing. In this example, light source 20 is mounted to side panel 32 at an opening therethrough. The transmittance of visible light through photochromic substrate 14 varies in response to exposure to ultraviolet light. Since light to be reflected by the mirror 10 passes through the photochromic material to the reflective material where it is reflected back through the photochromic material and the transmittance of visible light through the photochromic material is variable, the reflectance of the mirror 10 is therefore variable. A cable 36 for providing power to light source 20 extends from the opening in side panel 32. Light source 20 is preferably a low pressure mercury, lamp fitted with a phosphor to convert the lamp output from short UV (254 nm) to long UV (366 nm).

Reflective coating 16 may comprise a film of silver or aluminum. However, such is not transmitted to UV light as is the dielectric coating. According, with the silver or aluminum film light source 20 must be disposed in front of or about at least the reflective layer.

Photochromic substrate 14 may employ organic photochromic compounds as an active ingredient. Many organic photochromic compounds are useful. Some typical organic photochromic compounds are spirooxazines, spiropyrans, fulgides and fulgimides. Typically, the organic photochromic compound is dissolved in a polymeric medium as a carrier. Ideally, the polymeric medium is used as a coating, an adhesive for lamination or a potting compound. Such polymeric materials are, for example, cellulosics (e.g., cellulose acetate, cellulose acetate butyrate and cellulose acetate propionate), acrylics, poly(vinyl butyral), poly(vinyl chloride), poly(vinyl acetate), polyurethanes and silicones. The polymeric medium having the organic photochromic compound dissolved therein can also be coated on, for example, a typical glass mirror (i.e., a layer of glass having a film of silver or aluminum deposited on one surface thereof). However, with a photochromic coated glass mirror employing silver or aluminum as the reflective surface the UV light source must be disposed in front of or about the glass mirror and not behind the reflective surface as described above, since the UV light will not penetrate the silver or aluminum film.

Figure 4:
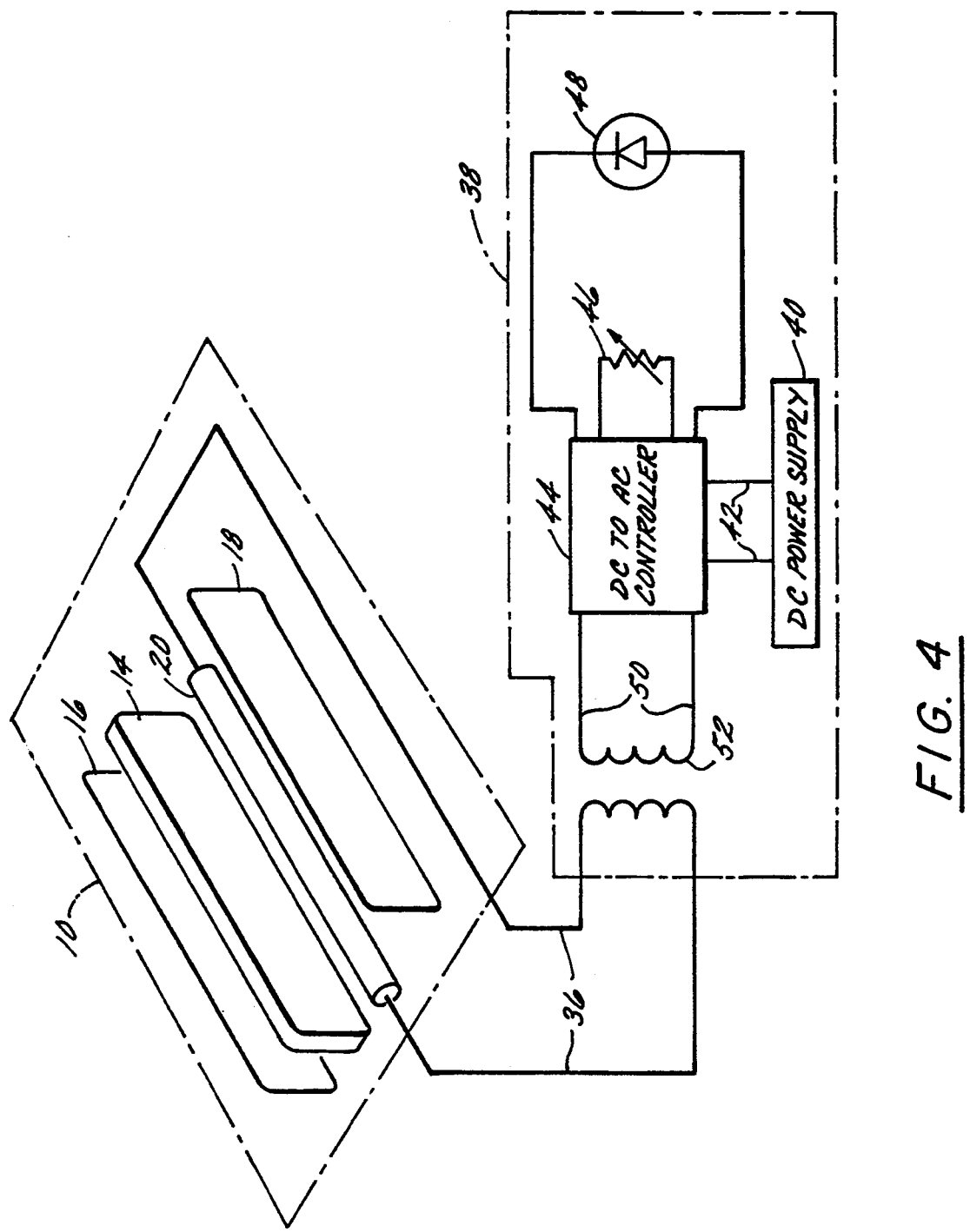
FIG. 4 is a schematic diagrammatic view of the photochromic light control mirror and control electronics.

Referring to FIG. 4, a schematic diagram on the photochromic light control mirror 10 and control electronics 38 is shown. A power source 40 preferably a twelve volt DC power supply with a variable voltage control unit is used for supplying power to the ultraviolet light source 20. The variable voltage control unit is used to control the light output intensity and thus control the transmission to the photochromic glass 14 and the reflectivity of the mirror 10. Power supply 40 is connected by lines 42 to a DC to AC controller 44 which converts a DC voltage to an AC voltage with amplitude regulation. This resulting AC voltage is amplitude regulated either manually by, for example; a variable resistor 46, automatically using a photo detector 48 (e.g., a photo diode) the output of which varies proportionately with the amount of light (i.e., the intensity of the light) detected, or more preferably, automatic regulation with a manual override. This controlled AC voltage on lines 50 is transformer coupled by a transformer 52 to light source 20 over cable 36. With automatic amplitude regulation control, the photo detector is to be located for detecting light entering the mirror and is therefore preferably disposed on or in housing 12. The remaining electronics are preferably located remote from the mirror within the vehicle. Alternatively, the power source and the control electronics could be disposed within housing 12 (i.e., as a stand alone unit), in this case the power source would comprise a replaceable battery.

To further illustrate the invention, the following examples are provided.

EXAMPLE 1

A photochromic solution was prepared by dissolving (150 g) of cellulose acetate butyrate (CAB-531-1, Eastman Chemical) in a mixture of methylene chloride (1200 g) and acetone (150 g) to which (1.5 g) of 1,3,3,4,5- and 1,3,3,5,6-pentamethyl-9'-methoxy-spiroindolinonaphthoxazine mixture and 3.0 g of Tinuvin 765 were added. A 2 inch by 6 inch standard glass mirror (i.e., a glass substrate having a reflective film deposited on one surface thereof) was dip-coated with the photochromic solution to provide a photochromic coating. The coating was first air dried for 15 minutes, followed by heating in an oven at 200° F. for 1 hour.

Figure 5:
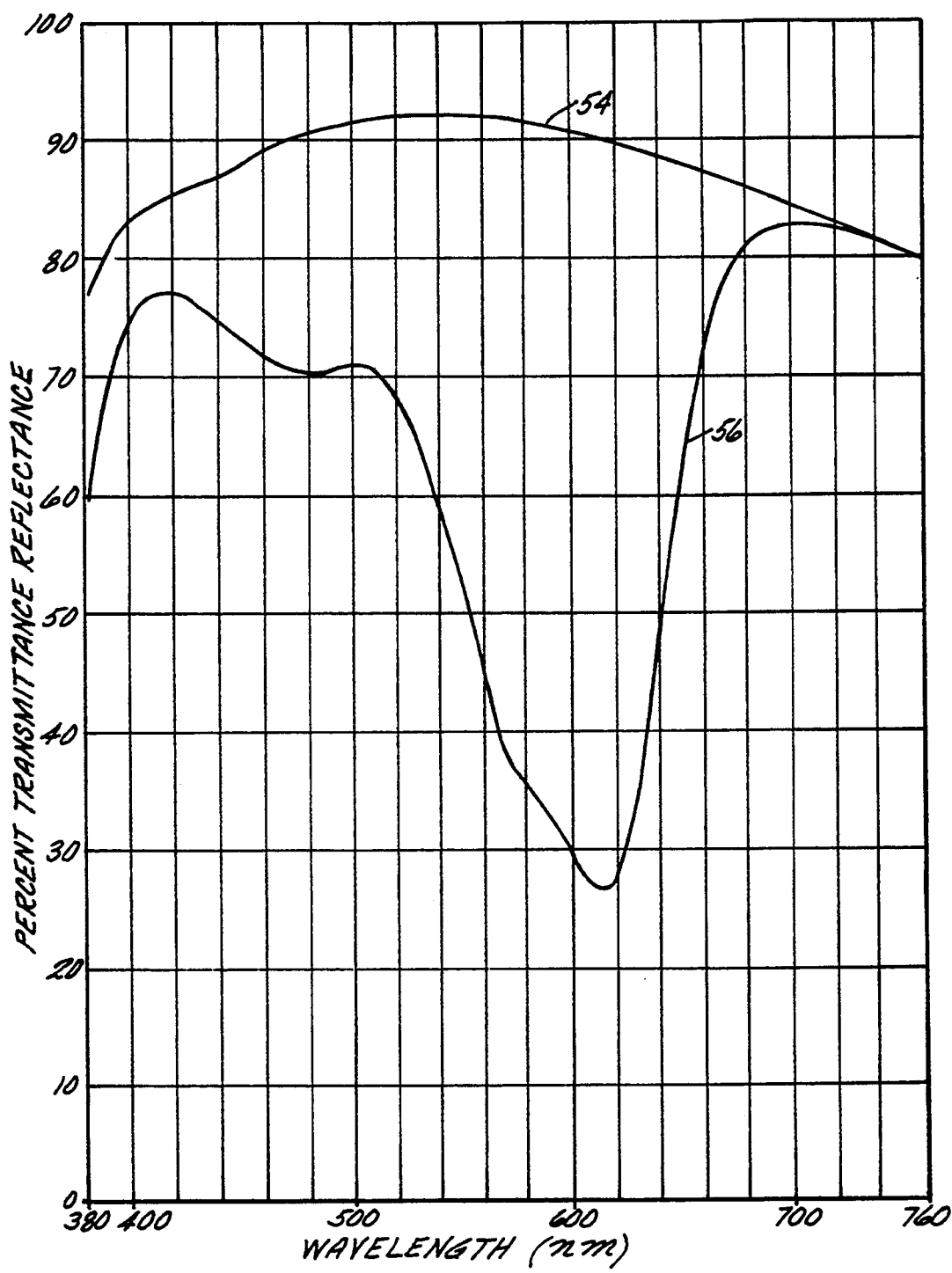
FIG. 5 is a plot of percent transmittance reflectance versus wavelength for Example 1 in accordance with the present invention.

The reflectance of the coated mirror was measured by a Diano Hardy spectrophotometer as shown in FIG. 5. The reflectance at 610 nm was 90% (line 54). The mirror was then exposed to UV light for 5 minutes. The reflectance spectrum was remeasured again. The reflectance at 610 nm decreased to 26% (line 56). The UV light was generated by a Black-Ray lamp manufactured by UVP, Inc.

EXAMPLE 2

A photochromic solution was prepared by dissolving 0.35 g of 1,3,3,4,5- and 1,3,3,5,6-pentamethyl-9'-methoxy-spiroindolinonaphthoxazine in 20 g of the B part of Conap DPTU-10403 (Conap). After all the dye was dissolved, added 15.3 g of the A part it was then stirred to mix well and degassed in a vacuum oven. The mixture was poured on a 3 inch by 6 inch glass mirror. A thin glass (0.02 inch) of the same size as the mirror was placed on top of the mirror to form a laminate. This adhesive mixture was cured at ambient temperature.

The reflectances before and after UV exposure were measured as described in Example 1. The reflectance at 610 nm was 91% before exposure and 20% after exposure.

EXAMPLE 3

A Photogray Extra flat piece is coated with a dielectric coating on one side to form a mirror. The reflectance of the mirror will change by exposure to UV light as described in the above Examples.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A variable reflectivity mirror comprising:
   a housing;
   photochromic means disposed in said housing for receiving light to be reflected, said photochromic means being transmittable to visible light;
   reflecting means disposed near said photochromic means for reflecting visible light transmitted through said photochromic means; and
   ultraviolet light source means within said housing for illuminating said photochromic means with ultraviolet light, wherein the transmittance of visible light of said photochromic means changes in response to illumination by ultraviolet light.

2. The mirror of claim 1 further comprising:
   ultraviolet shield means disposed near said photochromic means for blocking the transmission of ultraviolet light from said ultraviolet light source means transmitted through said photochromic means, said ultraviolet shield means being transmittable to visible light.

3. The mirror of claim 1:
   wherein said photochromic means comprises a photochromic substrate; and
   wherein said reflecting means comprises a layer of reflective material deposited on said photochromic substrate.

4. The mirror of claim 3 wherein said photochromic substrate comprises:
   a photochromic glass or a photochromic plastic.

5. The mirror of claim 4 wherein said substrate is photochromic glass comprising silver halide microcrystals finely dispersed therein.

6. The mirror of claim 4 wherein said substrate is photochromic plastic comprising an organic photochromic compound in a polymeric medium.

7. The mirror of claim 6 wherein said organic photochromic compound is selected from a group consisting of a spirooxazine, a spiropyran, a fulgide, and a fulgimide.

8. The mirror of claim 7 wherein said polymeric medium is selected from a group consisting of a cellulosic, an acrylic, poly (vinyl butyral), poly (vinyl chloride), poly (vinyl acetate), a polyurethane, and a silicone.

9. The mirror of claim 8 wherein said cellulosic is selected from a group consisting of cellulose acetate, cellulose acetate butyrate, and cellulose acetate propionate.

10. The mirror of claim 3 wherein said layer of reflective material comprises a layer of silver or aluminum.

11. The mirror of claim 3 wherein said layer of reflective material comprises a dielectric coating being transmittable to ultraviolet light and reflective to visible light.

12. The mirror of claim 11 wherein said dielectric coating comprises a plurality of high and low refractive index layers.

13. The mirror of claim 12 wherein said dielectric coating is represented as:
   $1.52/(HL)^5(1.3\ H\ 1.3L)^5 1.5H\ 0.5L/1.00$
   where;
   1.52 is a refractive index of a glass substrate,
   H is a high refractive index of a titanium oxide layer,
   L is a low refractive index of a silica layer,
   numerals preceding H and L are optical thicknesses of the layers; and
   1.00 is a refractive index of air.

14. The mirror of claim 1:
   wherein said photochromic means comprises an organic photochromic compound in a polymeric medium; and
   wherein said reflecting means comprises a layer of glass having a layer of reflective material deposited thereon, said reflecting means having said organic photochromic compound deposited thereon.

15. The mirror of claim 14 wherein said organic photochromic compound is selected from a group consisting of a spirooxazine, a spiropyran, a fulgide, and a fulgimide.

16. The mirror of claim 15 wherein said polymeric medium is selected from a group consisting of a cellulosic, an acrylic, poly (vinyl butyral), poly (vinyl chloride), poly (vinyl acetate), a polyurethane, and a silicone.

17. The mirror of claim 16 wherein said cellulosic is selected from a group consisting of cellulose acetate, cellulose acetate buyrate, and cellulose acetate propionate.

18. The mirror of claim 14 wherein said layer of reflective material comprises a layer of silver or aluminum.

19. The mirror of claim 14 wherein said layer of reflective material comprises a dielectric coating being transmittable to ultraviolet light and reflective to visible light.

20. The mirror of claim 19 wherein said dielectric coating comprises a plurality of high and low refractive index layers.

21. The mirror of claim 20 wherein said dielectric coating is represented as:
   $1.52/(HL)^5(1.3\ H\ 1.3L)^5 1.5H\ 0.5L/1.00$
   where;
   1.52 is the refractive index of a glass substrate,
   H is a high refractive index titanium oxide layer,
   L is a low refractive index silica layer,
   numerals preceding H and L are optical thicknesses of the layers; and
   1.00 is the refractive index of air.

22. The mirror of claim 14 wherein said organic photochromic compound is coated on said reflecting means.

23. The mirror of claim 14 further comprising:

a layer of glass disposed onto said organic photochromic compound, which has been deposited onto the reflecting means.

24. The mirror of claim 1 wherein said ultraviolet light source comprises:
a low pressure mercury lamp fitted with a phosphor.

25. The mirror of claim 1 further comprising:
means for varying the intensity of the ultraviolet light from said ultraviolet light source means.

26. The mirror of claim 25 wherein said means for varying the intensity comprises:
manual means for varying the voltage driving said ultraviolet light source means.

27. The mirror of claim 26 wherein said manual means comprises a variable resistor.

28. The mirror of claim 25 wherein said means for varying the intensity comprises:
automatic means for varying the voltage driving said ultraviolet light source means.

29. The mirror of claim 28 wherein said automatic means comprises photo detector means for varying the voltage driving said ultraviolet light source means in response to the intensity of visual light detected.

30. The mirror of claim 1 further comprising:
lens means for directing ultraviolet light from said light source towards said photochromic means.

31. The mirror of claim 1 is an automotive vehicle mirror.

* * * * *